United States Patent [19]

Cotton et al.

[11] Patent Number: 4,688,108

[45] Date of Patent: Aug. 18, 1987

[54] HIGH RESOLUTION GRAPHICS SYSTEM FOR VIDEO/TELECONFERENCING SYSTEMS

[75] Inventors: Robert V. Cotton, Chalfont; Edward J. Klodnicki, Lansdale, both of Pa.

[73] Assignee: Teleconference Systems, Inc., Horsham, Pa.

[21] Appl. No.: 786,673

[22] Filed: Oct. 11, 1985

[51] Int. Cl.⁴ .................. H04N 1/32; H04N 1/419; H04N 1/42
[52] U.S. Cl. ................... 358/257; 358/256; 358/261; 379/100
[58] Field of Search ............. 358/294, 256, 261, 257; 379/100

[56] References Cited

U.S. PATENT DOCUMENTS

| | | | |
|---|---|---|---|
| 4,387,395 | 6/1983 | Schaphorst | 358/256 |
| 4,486,787 | 12/1984 | Gocho | 358/294 |
| 4,494,149 | 1/1985 | Furukawa | 358/257 |
| 4,574,318 | 3/1986 | Dayton | 358/294 |
| 4,578,704 | 3/1986 | Gharavi | 358/261 |
| 4,587,633 | 5/1986 | Wang | 364/521 |

Primary Examiner—Howard W. Britton
Attorney, Agent, or Firm—Z. T. Wobensmith, III

[57] ABSTRACT

A high resolution graphics system scans an 8½×11 inch document at a resolution of approximately 200 lines per inch and transmits a run length codes 1700×2200 pixel array facsimile signal to a remote station for display or hard copy reproduction. Alternatively the present system can receive a compressed coded facsimile signal, decompress it and convert it to a video signal. The system is a modular design including the document scanning subsystem, a gray-to-facsimile converter, data compression and decompression circuits, as well as a high speed input/output communication system interface. The document scanning subsystem employs a fixed camera capable of scanning a document without any mechanical movement therebetween. The various modules are interconnected by means of a VME bus to a central processing unit which controls and monitors the system. A random access memory (RAM) is included for storing the compressed data either prior to transmission or subsequent to reception. The input/output interface includes a communications port, such as a RS449 port capable of sending or receiving data over the communication system at rates in the range of 56 to 448 Kbs.

7 Claims, 4 Drawing Figures

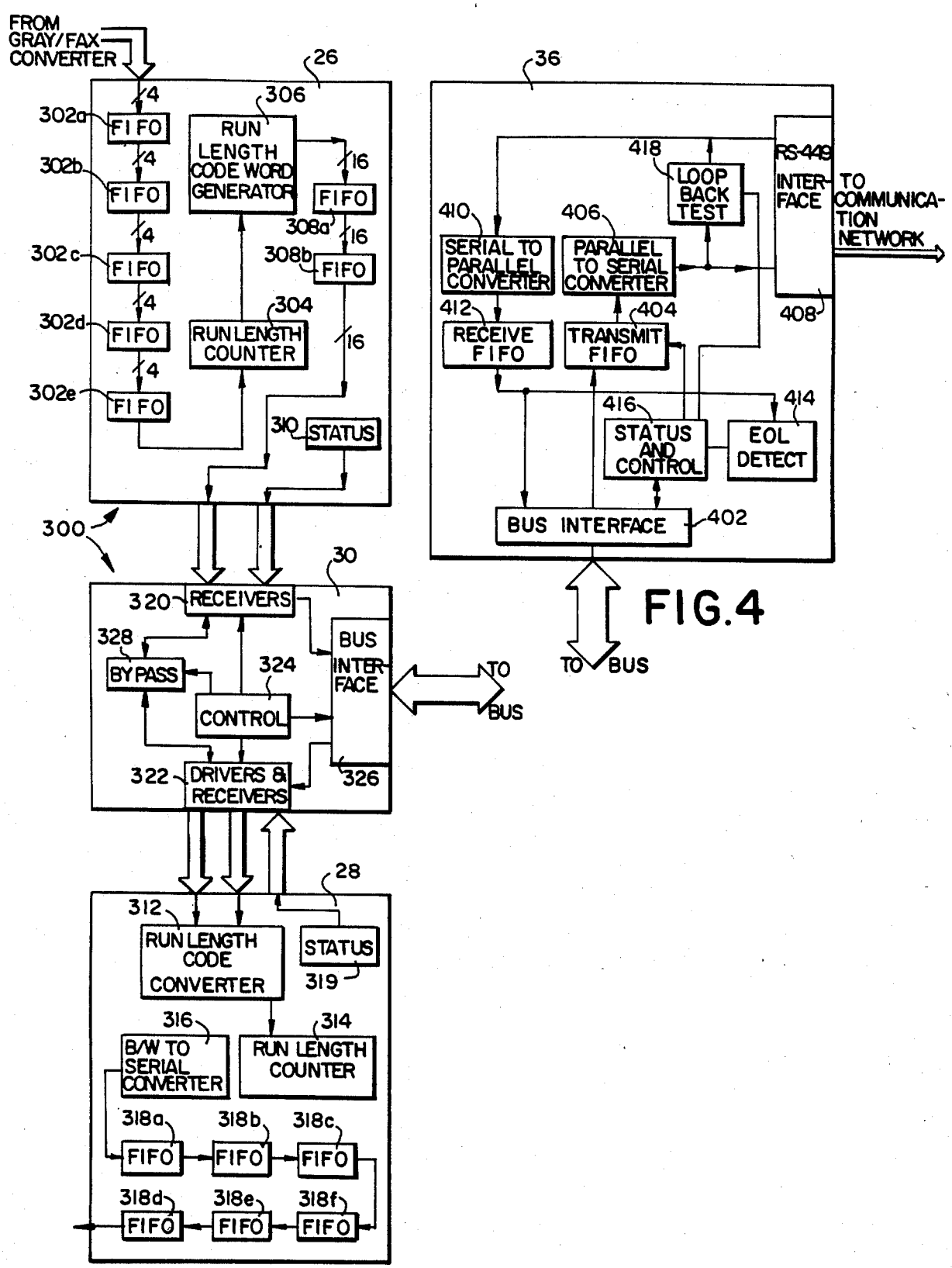

HIGH RESOLUTION GRAPHICS SYSTEM FOR VIDEO/TELECONFERENCING SYSTEMS

FIELD OF THE INVENTION

This invention relates generally to video and teleconferencing systems and more particularly to a high resolution graphics system for transmitting and reproducing documents between video/teleconferencing sites.

BACKGROUND OF THE INVENTION

Due to the high cost of travel and executive and employee time, many businesses are turning to video/teleconferencing technology to use their human resources more efficiently. Such video/teleconferencing systems must duplicate as closely as possible all of the conditions of a single location business meeting in order to be fully effective as a communications medium.

An important element of a successful video/teleconferencing system is the capability for allowing important documents to be transmitted from one location to another. This capability is essential since distribution and discussion of hard copy information such as financial data, charts, graphs, etc. are a usual part of most business meetings. It is most important that all participants in a video/teleconference be able to view such hard copy information in order to effectively conduct the meeting. Such a graphics system should provide a high degree of legibility, ease of use, and timely delivery or display. Although high resolution video technology has been available, it has not yet been satisfactorily applied in a video conferencing environment for transmission and reproduction of documents between the teleconferencing or video conferencing sites. Moreover, it is important that any such graphics transmission and reproduction system be easy to use in order to avoid the additional cost of highly skilled technicians to operate the system. A truly viable system should be capable of operation by an ordinary business executive without any special training.

Another essential capability of a viable graphics transmission system is the ability to transmit and display or reproduce the graphic material in a sufficiently short time to ensure continuity of communication between the teleconferencing participants. In this regard, transmission and display times of approximately 10 seconds or less are desirable. Finally, as in any system of this type, a high degree of reliability is important. Smooth, long-term operation with minimal down time is essential in order to prevent unncessary interruption of important business meetings.

SUMMARY OF THE INVENTION

A graphics transmission system for video/teleconferencing is realized in the high resolution graphics transmission system embodied in the invention. The high resolution graphics transmission system according to the invention includes a stationary scanner subsystem for providing a scanned image signal of a document or other graphic material to a control subsystem which compresses the scanned image signal, stores the image signal as required, and provides protocol interfaces for a high speed communication link to a remote teleconferencing site. The control subsystem also includes the protocol interfaces for reception of image data transmitted from a remote site and an image signal decompressor for reconstructing a facsimile signal based on the received image data. The facsimile signal provided by the decompressor is input to a facsimile to video converter for conversion to a form suitable for video display. A bus interconnects the scanner subsystem, the compressor, the decompressor, and the high speed communications link to a microprocessor which functions as the central processing unit for controlling and monitoring operation of the high resolution graphics system.

The scanning subsystem is capable of scanning a standard size 8½ × 11 inch document with a resolution of 200 lines per inch. The scanned image signal is compressed in order to provide reduced transmission time. Compression of the image signal is accomplished by a run length coding algorithm based on a modified Huffman code. The communication system interface is capable of transmitting or receiving data at rates in the range of 56–448 kilobits per second. Under these conditions a standard document image may be transmitted in 6–10 seconds to a remote teleconferencing site. A control panel is provided in close proximity to the scanning subsystem so that an operator may initiate transmission or initiate certain other functions with ease.

BRIEF DESCRIPTION OF THE DRAWINGS

The foregoing summary as well as the following detailed description of a preferred embodiment of the invention will be better understood when read in conjunction with the appended drawings, in which:

FIG. 3 is a block diagram of a compressor/decompressor subsystem for the high resolution graphics system of FIG. 1; and FIG. 4 is a block diagram of a high speed communication system input/output interface module for the high resolution graphics transmission system of FIG. 1.

DETAILED DESCRIPTION OF THE PREFERRED EMBODIMENT

Figure 1:
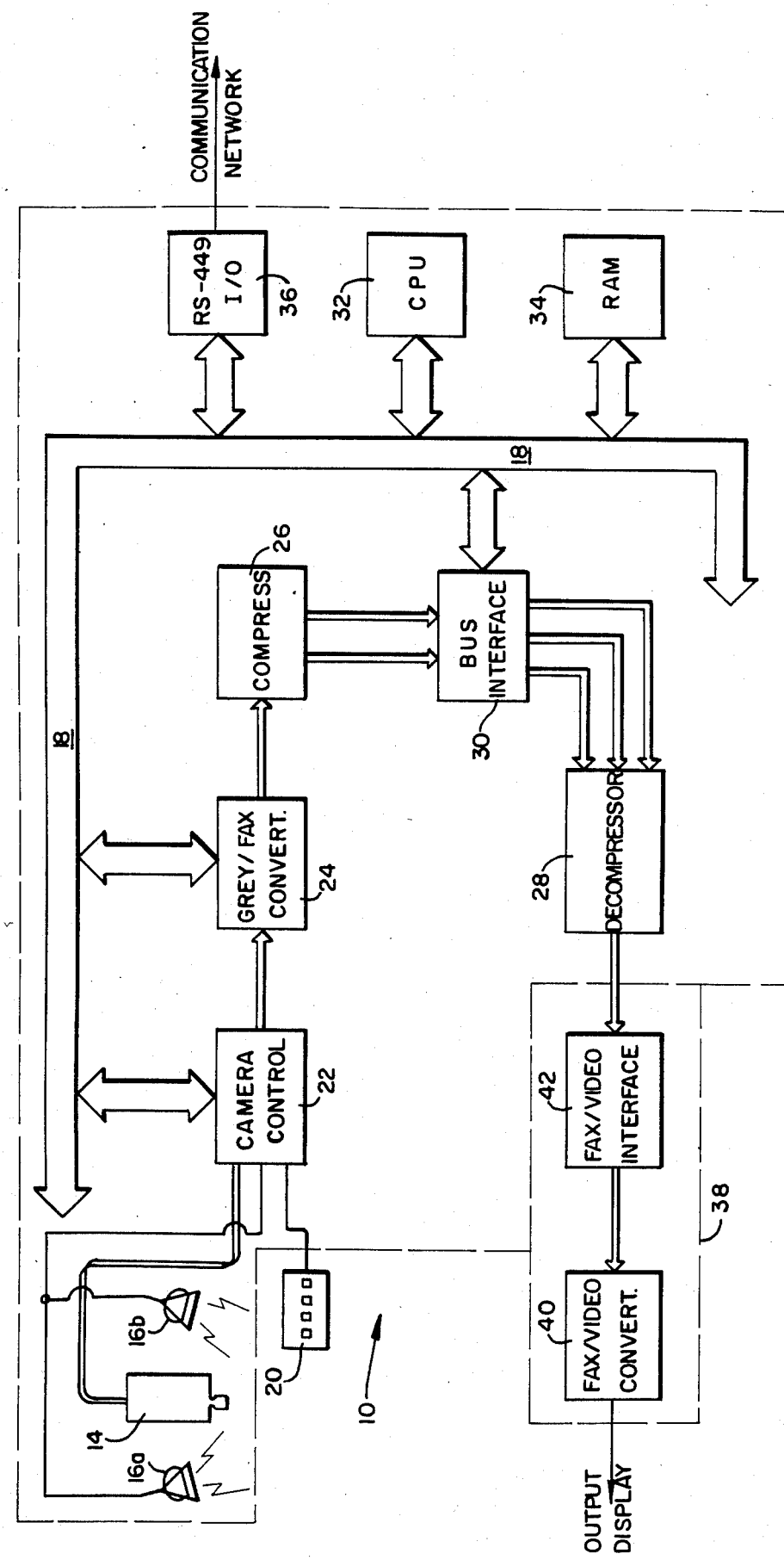
FIG. 1 is a diagram of a high resolution graphics system according to the invention.

Referring now to the drawings wherein like reference numerals indicate identical or corresponding elements across the several views, and in particular to FIG. 1, there is shown generally a high resolution graphics system 10. The system 10 includes a scanner assembly having a fixed camera 14, illuminating lamps 16a and 16b and a control panel 20. The scanner assembly which also includes camera control circuit 22 provides a video image signal of a scanned document.

The scanned image signal is input to a gray to facsimile converter 24 for conversion to a facsimile signal which digitally represents the image signal. The digital facsimile signal is input to a compressor circuit 26 which reads the facsimile signal and compresses the image data contained therein by implementing a run length coding algorithm. The compressed facsimile signal is then input to a main memory device 34 through an interconnection bus 18 via compressor/decompressor interface 30. Interconnection bus 18 consists of a standard data bus such as the VME Bus available from Motorola, Inc. of Phoenix, Ariz.

A central processing unit (CPU) 32 is interconnected with the camera controller 22, the gray-to-facsimile converter 24, the compressor circuit 26, decompressor circuit 28, and the main memory 34 by means of the interconnection bus 18. CPU 32 provides control signals to the various circuits and the main memory 34 and receives status signals from each of those devices for monitoring and controlling the high speed graphics system 10. CPU 32 includes a microprocessor of standard design such as the Model 68000 also available from Motorola. A high speed communication input/output interface 36 is provided in the system through bus 18. The communication system interface 36 provides a bi-directional high speed data link for both transmission and reception of image data to and from remote teleconferencing sites.

A decompressor circuit 28 is provided for converting compressed facsimile signals which are either received from a remote site or generated locally, to an expanded format. The expanded facsimile signal can then be input to a facsimile-to-video subsystem 38 which includes a facsimile-to-video interface 42 and a facsimile-to-video converter 40. Facsimile-to-video converter 40 converts the expanded facsimile signal into a suitable video signal for display on a high resolution television monitor or other video display device. The decompressor 28 can also provide a suitable signal to a document printer for hard copy reproduction of a scanned document.

Figure 2:
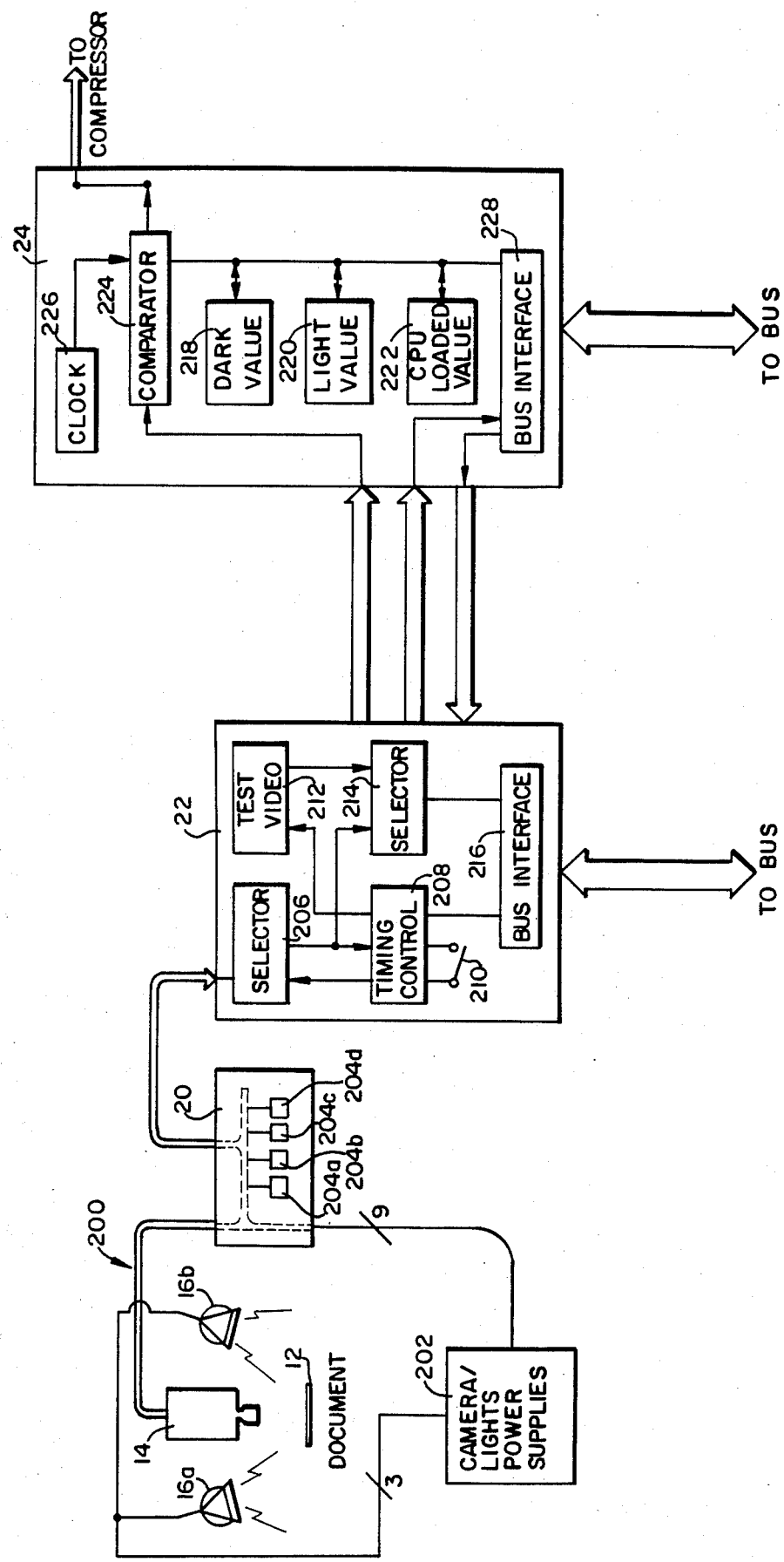
FIG. 2 is a diagram of a scanner subsystem for the high resolution graphics system of FIG. 1, including a fixed camera, camera controller, and a video to facsimile converter.

Referring now to FIG. 2, there is shown in greater detail the scanner assembly subsystem 200, including camera controller 22 and gray-to-facsimile converter 24. The heart of the scanner assembly subsystem 200 is a scanning camera 14 disposed for scanning a document 12. In practice, the camera 14 is positioned at the base of a light box (not shown) containing the illuminating lamps 16a,16b in order to optimize the scanned image. The light box may be mounted to a conference table or in a separate stand-alone console. Camera 14 is designed to scan an entire document without mechanical movement of either the camera 14 or the document 12.

In a normal configuration, the camera position and focal length are set so as to be able to scan an 8½×11 inch document at a resolution of 200 lines per inch. The design of camera 14 also makes it possible to locate camera 14 overhead of the document 12 as an alternative to under the light box. In this configuration, documents of varying sizes may be efficiently scanned by using a zoom lens on the camera 14. Suitable cameras are generally available, such as the Model C322 Camera manufactured by the Datacopy Corp. of Palo Alto, Calif.

The control panel 20 is mounted adjacent to the light box so that an operator can position a document 12 and initiate transmission in a convenient manner. Likewise, the camera and light power supplies 202 may be located in the light box or configured as a separate assembly based on the teleconferencing system facility requirements.

Control panel 20 includes four control switches 204a, 204b, 204c, and 204d. Each control switch initiates or enables a different control function. For example, control switch 204a controls the "Transmit" or "Send" function for initiating transmission of a document to a remote site. Control switch 204b initiates a "Landscape" function for rotating the transmitted document image by 90 degrees. Control switch 204c is used to select between two different threshold levels for processing the image signal when the original document contains faint or light images. Control switch 204d initiates a "Clear" function for interrupting transmission and clearing the system.

Camera control circuit 22 is connected to camera 14 through the control panel 20. Camera controller 22 includes an input selector 206 which contains circuitry for switching to an optional second camera or second control panel. Timing and control circuits 208 are provided for controlling the operation of the camera 14 and the illuminating lamps 16a,16b in response to control signals from the CPU 32. The timing and control circuits 208 also provide status signals to the CPU 32. An optional video test circuit 212 is provided for generating video test signals for system checkout or troubleshooting. An output selector circuit 214 is provided for switching between the camera video and test video circuit 212. Camera controller 22 also includes a VME bus interface 216. VME bus interface 216 includes buffer registers and associated circuitry for accepting control signals from and putting out status signals to the interconnection bus 18.

The gray-to-facsimile converter 24 provides circuitry to convert the image signal to a digital facsimile signal representative of the video image. The image signal out of camera 14 consists of a usable array of 1728 ×2200 picture elements, or pixels, consisting of eight bits per pixel. Each pixel represents a light intensity value. The gray-to-facsimile converter generates a facsimile signal by comparing the image signal pixel intensities to preset threshold values. Pixel intensities above the threshold are transmitted as white, whereas pixel intensities below the threshold values are transmitted as black.

To this end, gray-to-facsimile converter 24 includes a first memory device 218 for storing a dark or low intensity threshold value. A second memory device 220 stores a light or high intensity threshold value. Memory device 222 is provided for loading of a user defined threshold value input through the CPU 32. Memory devices 218, 220, and 222 each consist of an eight-bit register of standard design.

A comparator circuit 224 reads the image signal from camera 14 and the appropriately selected threshold value stored in memories 218, 220 or 222. The appropriate threshold value is selected by operation of the "Light Original" switch 204c on the control panel 20. The dark threshold value is selected for normal or dark original documents; this is the normal setting upon system start-up. The light threshold value is selected when the original document is light or faded. The user set value may be selected as desired by external input to the CPU 32.

Comparator circuit 224 outputs a first signal element indicative of a white pixel when the video signal is greater than the selected threshold value. Comparator 224 outputs a second signal element indicative of a black pixel when the video signal is less than the selected threshold value. A clock signal 226 from camera 14 serializes the output of comparator 224 and provides a synchronization signal for the serial facsimile signal. A bus interface circuit 228 includes buffer registers and associated circuitry for receiving control signals from and for outputting status signals onto the interconnection bus 18.

Data compression and expansion is employed on all transmitted documents. To this end, a data compression/decompression subsystem 300, as shown in FIG. 3, is employed. The compression/decompression subsystem includes the data compressor circuit 26 and a decompressor or expansion circuit 28. The compressor circuit 26 and expander circuit 28 share a common interconnection bus interface circuit 30.

Compression circuit 26 includes a plurality of first-in-first-out (FIFO) memories 302a–302e. FIFO memories 302a–302e serve as input buffers for the serial facsimile data signals from the gray-to-facsimile converter 24. A run length counter circuit 304 reads the four-bit data signal in FIFO memory 302e and sequentially counts the number of white and black pixels presented in the facsimile data signal. Run length counter 304 generates a run length count signal corresponding to the number of each of the white or black pixels as they are sequentially counted.

The run length count signal is output to a run length code word generator 306. Run length code word generator 306 includes a programmable read only memory (PROM) containing a plurality of run length codes corresponding to various run length counts. The run length codes are obtained by implementation of a modified Huffman compression algorithm. The modified Huffman code is the standard for the CCITT facsimile Group 3 transmission characteristic and is well known by those skilled in the art. A description of the modified Huffman code may be found in the paper "International Digital Facsimile Coding Standards" by Roy Hunter and A. Harry Robinson, Proceedings of the IEEE, volume 68, No. 7, July 1980.

Run length code word generator 306 outputs a run length code signal corresponding to the run length count value from counter 304. The run length codes are temporarily stored in output buffers 308a and 308b. Output buffers 308a and 308b consist of 16-bit FIFO memories of standard design.

A compressor monitoring circuit 310 provides status signals to the CPU 32 concerning the operation of compressor circuit 26. The compressed data is written to the main memory 34 which consists of a 512K byte random access memory (RAM). The compressed data is held in main memory 34 until it is to be transmitted.

A decompressor or expander circuit 28 is provided for expanding compressed data received from a remote source or generated locally. Decompressor circuit 28 includes a run length code converter 312 for converting the run length codes of the compressed facsimile signal into run length count signals. Although not shown, one or more 16-bit input FIFO memories may be connected ahead of the run length code converter 312 in order to buffer the facsimile data into the decompressor 28. Run length code converter 312 consists of a programmable read-only memory (PROM) programmed with a look-up table for modified Huffman code conversion. For example, upon reading a run length code word from the buffer memory, the converter 312 generates an appropriate run length count corresponding thereto. The run length count signal is input to a run length counter circuit 314 which counts out black and white pixels in accordance with the run length counts provided by converter 312. A black and white to serial converter circuit 316 receives the respective run lengths of black and white pixels and generates a serial data stream therefrom. The serial data stream is stored in a series of output buffers 318a–318f consisting of 4-bit FIFO memories. The serial data stored in buffer memories 318a–318f represents a facsimile signal which can be converted by appropriate means for either video display or printed reproduction.

In the embodiment shown in FIG. 3, the compressor circuit 26 and decompressor circuit 28 share a common bus interface circuit 30. This interface includes receiver circuits 320 consisting of buffer registers and associated circuits for reading compressed data from the compression circuit 26. Likewise, signal driving and receiving circuit 322 includes appropriate buffer registers for transmitting compressed data to the decompressor circuit 28 and for receiving status signals from the status monitoring circuit 319 of decompressor 28. Compressor/decompressor interface circuit 30 includes control circuitry 324 for regulating the operation of the receiver circuits 320 and driver and receiver circuits 322 in response to control signals from the central processing unit 32. Appropriate VME bus interface circuity 326 is provided, consisting of necessary registers and circuitry for receiving data and control signals from and for putting out status and data signals onto the VME bus 18. An optional bypass circuit 328 may be included in the interface circuit 30 for use when it is desired to bypass the main memory 34 and provide compressed data directly from the compressor circuit 26 to decompressor circuit 28, such as for local testing.

Referring now to FIG. 4, there is shown in greater detail the communication system input/output interface 36. Input/output interface 36 has a VME bus interface circuit 402 including necessary buffer registers and associated circuitry for receiving signals from and putting signals out onto the VME interconnection bus 18.

Compressed facsimile signals to be transmitted to a remote station are input to a transmit buffer memory 404 consisting of a 16-bit FIFO memory device. The 16-bit run length code words of the compressed facsimile signal are read from transmit memory 404 by a parallel-to-serial converter 406 which converts the data words to a serial data stream for transmission over the communication network. A high speed data link interface 408 is provided for coupling the facsimile data signal onto the communication network. The interface circuit 408 is constructed in accordance with the Electronics Industry Association (EIA) RS449 specification. The RS449 interface operates at data rates in the range of 56–448 kilobits per second.

Input/output circuit 36 also includes necessary circuitry for receiving facsimile data signals from a remote station. In this regard, the RS449 interface 408 includes receiver circuitry capable of receiving data at the aforementioned rates. The received data is input to a serial-to-parallel converter circuit 410 which converts the serial data to 16-bit run length code words. The run length code words are stored in the receive FIFO memory 412 until they can be transferred to the main memory 34 for temporary storage. An end-of-line detector circuit 414 monitors the received data for synchronizing with the end of each line of image data.

Status and control circuit 416 is provided for monitoring and controlling operations of the input/output interface 36 in accordance with commands and requests from the central processing unit 32. An optional loop-back circuit 418 is provided for local testing of the high resolution graphics system when necessary.

A better understanding of the performance and utility of the high resolution graphics system 10 may be gained from the following description in conjunction with FIGS. 1–4. The high resolution graphics system 10 operates in five different modes: a power-up initialization mode; a control mode; a transmit mode; a receive mode; and a clear mode. The initialization mode is entered when power is first applied to the central processing unit 32. The operating software executed by CPU 32 initiates the following operations. All CPU registers and input/output ports are initialized to their normal states. The main memory 34 is initialized and tested. All external hardware connected to the high resolution graphics system 10 is reset to a specified state. Built-in test routines are executed as required. The facsimile to video subsystem 38 is cleared. The camera control and RS449 input/output interface are set up. Upon completion of these operations, the operating software exits the initialization mode and enters the control mode.

The operating software enters the control mode after initialization or upon completion of a transmit function, a receive function, or a clear function. Each time the control mode is entered, the following procedures are performed. The receive side of the RS449 interface 408 is reset to prepare for reception of image data. Buffer pointers and flags in the input/output interface 36 for both transmit and receive functions are reset. Interrupt routines are enabled on the receive side of the RS449 interface to allow subsequent processing of image data when it is received.

Upon completion of these steps, the control mode program enters its main loop, which sequentially polls the control panel 20 and the RS449 input/output interface 36. During this phase of operation, the CPU 32 responds to commands from the control panel 20 and permits the system 10 to perform the requested function. CPU 32 also responds to the RS449 input/output interface 36 when image data is received so that the system may process the data for display or reproduction.

The transmit mode is entered when a "Transmit" or "Send" command is received from the control panel 20. The transmit mode software constructs and sends a header message containing configuration information for the image data to be transmitted. The image data is transmitted as a series of modified Huffman codes indicative of an array of 1700 ×2200 1-bit pixels representing the image of the scanned document.

The central processing unit 32 executes the following steps in order to transmit image data.

1. A header message is formated including all necessary configuration data.
2. The transmit interrupt pointer is set to the header message.
3. The "request to send" and "clear to send" sequence, sometimes known as "handshaking", is executed to gain access to the communication system.
4. The transmit interrupt circuit is enabled, causing the transmit interrupt handler subroutine circuit to transfer the contents of the header message to the transmit FIFO memory 404 in the input/output interface 36.
5. The illuminating lamps 16a, 16b in the light box are turned on.
6. The facsimile-to-video subsystem 38 is cleared and the facsimile-to-video converter is turned on.
7. The compressor circuit 26 is cleared.
8. The line counters in compressor 26 and decompressor 28 are reset to zero.
9. The camera 14 is started.
10. The contents of the compressor 26 are read and transferred to main memory 34 until one complete line is available. The end-of-line code assigned by compressor circuit 26 indicates the end of a complete line of image data. The compressor line counter is then updated.
11. The transmit control circuit 416 is restarted if necessary, to keep the image data flowing from the main memory 34 to the transmit FIFO 404. The transmit control circuits 416 stop transfer of image data to the transmit FIFO 404 at the end of each data line if another line is not available.
12. The decompressor circuit 28 is supplied with as much image data as it will accept or as much as is available in main memory 34. The decompressor line counter is updated as required
13. CPU 32 checks to determine if a "Clear" command has been issued from the control panel 20. If a clear command has been issued, the clear mode software is executed.
14. The compressor line count is tested and, if less than 2200, the software continues execution at step 10 above. Due to variations in compression efficiency, fill data is added to the transmitted signal when the compressor 26 cannot keep up with the transmission of image data from input/output interface 36.
15. The decompressor line count is tested and if less than 2200, the software continues execution as at line 12 above.

Upon completion of the foregoing steps, the transmit mode software performs a standard exit routine to make sure that the entire contents of the transmit FIFO 404 has been sent out onto the communication network. Upon verification of this, the RS449 interface 408 is decoupled from the communication network. The operating software then returns to the control mode.

The receive mode is entered from the control mode whenever the control mode software detects a received image message from the input/output interface 36. The receive or input side of input/output interface 36 is interrupt-driven. That is, a receive interrupt will occur when the receive FIFO 412 is half full. Control circuit 416 then causes transfer of the contents of receive FIFO 412 to a section of the main memory 34 and sets an event flag to indicate the presence of the received data. Control circuit 416 also checks for a FIFO empty status prior to the transfer of each code word and exits when the receive FIFO 412 is found to be empty.

The receive mode main program first determines if the received message is valid. This is attempted when a complete message is available for processing. Since header messages always precede data transmission, the receive mode software checks for the presence of a header code or an end-of-line code. If these codes are correct, then the receive mode software will initiate the sequence of steps for image reception, as follows.

1. Image configuration information is passed to the facsimile to video subsystem 38.
2. The line counters for the decompressor 28 are reset to zero.
3. The buffer pointer used by the receive interrupt handler software is assigned to a section of the main memory 34.
4. The receive interrupt software is enabled.

At this point the received image data will start filling a section of main memory 34. This data flow is controlled by the receive interrupt handler routines. The receive mode main program now performs the following steps:

1. Image data is supplied to the decompressor 28 as it becomes available in the main memory 34. As the data is transferred to the decompressor 28, a check is performed to avoid overflow.
2. At the end of each image data line, the decompressor line count is updated and a test made to determine if the full 2200 line image has been received. If so, a return is made to the control mode. Otherwise, or unless a "Clear" command has been received, the receive mode software continues execution as at step 1 above.

The receive mode interrupt handler subroutine will automatically interrupt receiving of data under any one of the following conditions:
1. The received compressed line count reaches 2200;
2. The image buffer in main memory 34 is filled; or
3. A header message is received indicating either the end of the image data transmission or a "Clear" command issued from the remote sending station.

The clear mode of the system controller is entered whenever a "Clear" command is received from either the control panel 20 or from a remote teleconferencing station through input/output interface 36. The CPU 32 performs the following steps under control of the clear mode software. Some of these steps are executed depending upon the state of data transmission at the time that the clear mode is entered.

1. Image data transmission is terminated in an orderly manner. This means that if an image was being transmitted, a header message is generated with an "end" indicator. This is followed by a header message with a "Clear" command indicator. As a result, the remote teleconferencing site will clear its facsimile-to-video subsystem and return to the control mode. If an image is being received, the "Clear" command will be processed when the receive mode returns to the control mode.
2. The local facsimile to video subsystem is cleared.
3. The switch or button settings on control panel 20 are reset.
4. The central processing unit 32 waits for camera 14 to complete any scanning in progress.

Upon completion of the clear mode procedure, the operating software returns the CPU 32 to the control mode until subsequent modes are initiated.

Some of the many advantages and novel features of the invention should now be apparent in view of the foregoing description and accompanying drawings. For example, a high resolution graphics system has been described which includes a central processing unit 32 interfaced with a scanning camera 14, associated camera controller 22, a gray-to-facsimile signal converter 24, a run length coding compression circuit 26 and comparable decompressor circuit 28, as well as a high speed input/output communication system interface 36. These devices are interconnected by a VME interconnection bus 18.

The advanced design of the camera eliminates the need for mechanical motion in scanning a document and provides a high resolution image signal. Since there is no mechanical motion required to scan the document, it is possible to locate the camera for scanning documents of varying sizes.

A modified Huffman code is utilized in the compressor 26 for run length coding compression of the facsimile signal, permitting high speed, efficient data transmission.

Additionally, the high resolution graphics transmission system includes a communications interface 36 which incorporates a high speed data link such as the RS449. This type of communications interface permits a standard $8\frac{1}{2} \times 11$ inch document to be transmitted and displayed in six to ten seconds at transmission rates of from 56-448 kilobits per second. This fast transmission speed permits the high resolution graphics system to be completely interactive for teleconferencing applications.

Moreover, the modular design of the high resolution graphics system permits it to be packaged as a self-contained movable unit, eliminating the need for extensive cabling between subsystems and thus permitting the unit to be portable. The system is easily adaptable to existing teleconferencing facilities also, since key subsystems do not have to be co-located. The camera, camera control, control panel, and the central processing unit and data processors can be physically installed in different locations.

It will be recognized by those skilled in the art that changes or modifications may be made to the above-described embodiment without departing from the broad inventive concepts of the invention. For example, additional RS449 high speed communications interface or other types of communications ports could be utilized. Of course, various interfaces for video display or printed reproduction of the scanned document could likewise be implemented. If desired, appropriate hardware and software could be implemented for generating a pointer display to be used in conjunction with display and transmission of the document image. Moreover, additional external controls may be connected to the CPU 32 to provide added control flexibility. It is understood, therefore, that the invention is not limited to the particular embodiment which is disclosed, but is intended to cover modifications and changes which are within the scope and spirit of the invention as defined by the appended claims.

What is claimed is:

1. A high resolution graphics system for video-conferencing, comprising:
   stationary document scanning means for optically scanning a document without any portion having a mechanical movement relative to said document and for outputting a facsimile signal representative of the document, said stationary document scanning means designed to generate said facsimile signal by way of a series of first and second signal elements;
   facsimile signal compression means responsive to said facsimile signal for compressing said facsimile signal in accordance with a run length coding algorithm;
   main memory means for storing compressed facsimile signals;
   communication system interface means for accepting said facsimile signal in compressed form and transmitting the same to a remote location;
   system control means for providing control signals and for receiving status signals to respectively control and monitor the operations of each of: said document scanning means; said facsimile signal compression means; said main memory means; and said communication system interface means; and
   system interconnection means for interconnecting each of said system control means, said document scanning means, said facsimile signal compression means, said main memory means, and said communication system interface means, all with each other whereby a signal flow path is provided for carrying control, status, and facsimile signals.

2. A high resolution graphics system as recited in claim 1 wherein said facsimile signal compression means comprises:
   input memory means operatively connected for receiving and temporarily storing a series of digitized facsimile signals from said stationary document scanning means;

run length counter means operatively connected for reading the facsimile signals from said input memory means, for alternatively counting the first and second signal elements in the facsimile signals, and for providing run length count signals respectively indicative of said first and second signal elements;

run length coding means responsive to the run length count signals from said run length counting means for providing a compressed coded signal corresponding to each run length count signal; and output memory means operatively connected for receiving and temporarily storing a plurality of compressed coded signals from said run length coding means, and for outputting a group of said compressed coded signals, said compressed coded signals constituting a compressed facsimile signal.

3. A high resolution graphics system as recited in claim 1 wherein said stationary document scanning means comprises:

means for receiving an imprinted document and holding said document in a fixed position;

lighting means for illuminating the document;

a fixed camera having a lens disposed for viewing the entire document, said fixed camera being formed to scan the entire document without mechanical movement between any section of said camera and the document and for providing a digitaized image signal representative of the document;

camera control means operatively connected between said fixed camera and said system interconnection means for receiving and interpreting control signals from said system control means, for providing camera control signals in response to the command signals, and for providing camera status signals back to said system control means; and image signals conversion means operatively connected to said fixed camera for converting the digitized image signal to said facsimile signal.

4. A high resolution graphics system as recited in claim 3 wherein said image signal conversion means comprises:

memory means for storing a threshold value indicative ot a particular quantity of light intensity;

comparator means operatively connected for receiving the image signals and for reading the threshold value stored in said memory means, said comparator means being formed for comparing the image signal to the threshold value and for providing a facsimile signal representative of said image signal, said facsimile signal consisting of first and second signal elements such that a first signal element is provided when the image signal intensity is greater than the threshold value and a second signal element is provided when the image intensity is less than the threshold value; and clocking means operatively connected for permitting the facsimile signal from said comparator means to be output in a serial manner.

5. A high resolution graphics system as recited in claim 1 further comprising means for locally displaying an image of a scanned document.

6. A high resolution graphics system as recited in claim 5 wherein said local display means comprises:

decompressing means for decompressing the compressed facsimile signal and for providing an expanded facsimile signal, said decompressing means being operatively connected for reading the compressed facsimile signal from said main memory means; and facsimile signal converter means responsive to the expanded facsimile signal for converting the expanded facsimile signal to a video signal.

7. A high resolution graphics system as recited in claim 6 wherein said decompressing means comprises:

code converter means operatively connected for reading a compressed facsimile signal, for converting the compressed facsimile signal to first and second signal element run length counts, and for providing a run length count signal indicative of the counts of first and second signal elements; and facsimile signal generating means connected to said run length counter and responsive to the run length count signal for generating a series of first and second signal elements indicative of a facsimile of a video image such that said first signal element corresponds to a white image and said second signal element corresponds to a non-white image.

* * * * *